(12) United States Patent
Sas Freixenet et al.

(10) Patent No.: US 12,129,058 B2
(45) Date of Patent: Oct. 29, 2024

(54) FLOW REGULATION SYSTEM FOR THE FILLING OF A SACK WITH A GRANULAR PRODUCT, AND CORRESPONDING MACHINE AND METHOD

(71) Applicant: TECNICAS MECANICAS ILERDENSES, S.L., Lleida (ES)

(72) Inventors: Josep Sas Freixenet, Lleida (ES); Juan Jose Gonzalez Toledano, Lleida (ES)

(73) Assignee: TECNICAS MECANICAS ILERDENSES, S.L., Lleida (ES)

( * ) Notice: Subject to any disclaimer, the term of this patent is extended or adjusted under 35 U.S.C. 154(b) by 492 days.

(21) Appl. No.: 17/436,413

(22) PCT Filed: Mar. 7, 2019

(86) PCT No.: PCT/ES2019/000018
§ 371 (c)(1),
(2) Date: Sep. 3, 2021

(87) PCT Pub. No.: WO2020/178461
PCT Pub. Date: Sep. 10, 2020

(65) Prior Publication Data
US 2022/0127025 A1    Apr. 28, 2022

(51) Int. Cl.
*B65B 1/06* (2006.01)
*B65B 1/32* (2006.01)
(Continued)

(52) U.S. Cl.
CPC ............ *B65B 1/06* (2013.01); *B65B 1/32* (2013.01); *B65B 39/002* (2013.01); *B65B 57/145* (2013.01); *G01F 11/003* (2013.01)

(58) Field of Classification Search
CPC .... B65B 57/145; B65B 39/002; G01F 11/003
See application file for complete search history.

(56) References Cited

U.S. PATENT DOCUMENTS 5,168,906 A   12/1992   Combrink
5,443,102 A    8/1995   Svendsen
(Continued)

FOREIGN PATENT DOCUMENTS

EP       0842087 B1    1/2002

OTHER PUBLICATIONS

International Search Report from corresponding International Application No. PCT/ES2019/000018 mailed on Nov. 7, 2019.
(Continued)

*Primary Examiner* — Timothy P. Kelly
(74) *Attorney, Agent, or Firm* — Tucker Ellis LLP (57) ABSTRACT

A flow control system for filling a bag with a granular product, including an acceleration conduit with a metering side where there is arranged a metering device and a filling side for the bag. A control device with movable control blades and a first sensor is provided at an intermediate point of the conduit. A second sensor is provided on the filling side. The control device and sensors are functionally associated with one another such that the blades of said control device move among one position of said plurality of positions depending on if said first and second sensors detect an accumulation of granular product on said filling side which may delay the filling of said bag.

6 Claims, 5 Drawing Sheets

(51) Int. Cl.
*B65B 39/00* (2006.01)
*B65B 57/14* (2006.01)
*G01F 11/00* (2006.01)

(56) References Cited

U.S. PATENT DOCUMENTS

| | | | |
|---|---|---|---|
| 6,119,438 A * | 9/2000 | Bacon | B65B 9/2028 |
| | | | 53/493 |
| 10,730,650 B2 * | 8/2020 | Curcó | B65B 57/145 |
| 2010/0219002 A1 | 9/2010 | Nakagawa et al. | |
| 2012/0198799 A1 * | 8/2012 | Nishitsuji | B65B 37/18 |
| | | | 53/551 |
| 2018/0141690 A1 | 5/2018 | Curco Masip et al. | |

OTHER PUBLICATIONS

International Preliminary Report on Patentability from corresponding International Application No. PCT/ES2019/000018 mailed on Feb. 12, 2021.

* cited by examiner

FLOW REGULATION SYSTEM FOR THE FILLING OF A SACK WITH A GRANULAR PRODUCT, AND CORRESPONDING MACHINE AND METHOD

RELATED APPLICATION DATA

This application is a national phase application of International Application No. PCT/ES2019/000018 filed Mar. 7, 2019. The entirety of the aforementioned application is incorporated herein by reference.

FIELD OF THE INVENTION

The invention relates to a flow control system for filling a bag with a granular product, comprising an acceleration conduit with a metering side, there being provided adjacent to said metering side a metering device comprising a metered amount holder movable between a holding position for holding a metered product amount, and a discharging position for discharging said metered product amount, and a filling side comprising receiving means for receiving a bag to be filled.

The invention also relates to a machine incorporating a flow control system according to the invention.

Finally, the invention relates to a flow control method for filling a bag with a granular product through an acceleration conduit, said acceleration conduit having a metering side and a filling side for filling said bag where an initial bag is located.

STATE OF THE ART

There are several industries in which their granular products (plastic pellets, fertilizers, sugar, etc.) are packed in plastic bags or sacks, raffia bags, or containers having similar characteristics, and being presented in metered amounts of about 25 kg in capacity. In the invention, a granular product is understood to be a product the grain size of which is larger than 50 microns.

Automatic high output machines are used to fill containers of this type. In the invention, a high output machine is understood to be an hourly output of more than 1800 bags/hour.

Moreover, bags with side folds are used in many industries to improve container presentation and filled bag pallet stability.

Another growing trend is to use machines generally known as FFS (Form, Fill, and Seal) machines which make the bag in the machine itself from a roll or reel of plastic tube, with the side folds duly formed. Said machines produce the bag, fill it with the corresponding product, and seal it by welding it in the machine itself. Nevertheless, it must be pointed out that bags of this type are not used exclusively in these machines. In that sense, in the context of the invention, the system is not limited to application in FFS machines.

Furthermore, in the case of bags of this type, the side folds or pleats must always remain firmly secured in the fill opening area during the bag filling and sealing process. This is to prevent bag deformation which would prevent proper container closure and finish. Since the folds must be secured, the useful fill opening of the bag is significantly reduced. Due to the reduced available passage section, slow filling may occur.

In the state of the art, a solution consisting of accelerating the product as it travels between the metering device and the bagging opening of the machine is used to solve this problem. To that end, the use of a gravity-induced acceleration conduit having suitable length and a conical shape has generally been used. This acceleration conduit connects the chute collecting the product discharged from the metering device (larger section of the conduit) and drives it as it gains speed to the bagging opening (smaller area).

If the beginning of the acceleration conduit opens too much, a blockage will occur and the product will lose speed as it passes therethrough. This prolongs travel time and results in production loss. On the other hand, an insufficient passage opening on the metering side of the acceleration conduit will also penalize performance of the bagging station.

EP 0842087 A1 discloses a method and an apparatus for feeding substantially free flowing solid product charges in a continuous vertical form, fill and seal packaging machine.

US 2018/141890 A1 discloses a product discharge control device for a form-fill-seal machine for filling bags reliably and more quickly.

US 2010/219002 A1 discloses a measuring device comprising a measuring part configured and arranged to discharge a group of objects measured in a predetermined weight at a predetermined time interval and a hopper disposed below the measuring part.

U.S. Pat. No. 5,168,906 A discloses an apparatus for filling discrete open or valve type bags with metered quantities of flowable bulk material has a gravity flow duct the upper end of which receives metered quantities of bulk material and the lower end of which discharges successive metered quantities into discrete bags.

Finally, U.S. Pat. No. 5,443,102 A discloses a method for filling a bag causing particulate material to flow from a container under gravity through a filling duct into a liner of the bag.

SUMMARY OF THE INVENTION

The invention faces the problem of proposing a flow control system for filling a bag with a granular product which allows increasing the bag filling speed, reducing the risk of the acceleration conduit being blocked and unnecessary machine standstills.

This is achieved by means of a flow control system of the type indicated above, characterized in that it further comprises a flow control device, said control device being provided between said metering side and said filling side and comprising at least one control blade, said at least one control blade being movable between a plurality of control positions located between a maximum opening position of said conduit in which a maximum flow of said granular product can pass through said control device, and a closed position of said conduit in which the flow of said granular product through said control device is interrupted, a first granular product passage sensor provided at an intermediate point located between said metering and filling sides, upstream of said at least one control blade and functionally associated with said control device, a second granular product passage sensor provided on said filling side, and said metering device, said control device, and said first and second sensors being functionally associated with one another such that said metered amount holder of said metering device moves between said holding and discharging positions and said at least one blade of said control device moves among one position of said plurality of positions depending on if said first and second sensors detect an accumulation of granular product on said filling side which may delay the filling of said bag.

Therefore, the system according to the invention allows compensating for small or large variations that may occur due to density, fluidity, or other factors. These variations may even arise in one and the same production batch and may affect the acceleration of the product to be bagged as it falls. As explained, this can drastically reduce bagging machine productivity. Therefore, as a result of the first and second sensors, events occurring in the area of the bag and events which will occur in the following time instants can be anticipated, which allows the concurrence of two metered amounts, without the risk of both metered amounts falling into one and the same bag, despite being metered very close to one another time-wise. In other words, as a result of the control device the subsequent metered amount can be discharged when the bag from the preceding batch is still arranged at the filling end. Accordingly, this allows significantly increasing the bag filling speed.

The invention further includes a number of preferred features that are object of the dependent claims and the utility of which will be highlighted hereinafter in the detailed description of an embodiment of the invention.

In a preferred embodiment having the objective of optimizing the reaction speed of the control device, said at least one control blade are two plates that are symmetrical with respect to a longitudinal axis of said conduit, and in that in said closed position, said two plates form with respect to one another an angle less than 180°, the vertex of which points towards said filling side. As a result of this angle, in combination with the planar plates, the reaction is immediate, particularly in the case of opening the plates. In a particularly preferred manner, the angle between both plates is comprised between 75 and 150°.

In a particularly preferred manner, said at least one control blade is pivotably mounted around a pivot shaft.

In another embodiment, the cross-section of said conduit tapers from the metering side to the filling side.

Additionally, the receiving means comprise suction means configured for suctioning the filling side of said conduit. In the event that a metered product amount causes an obstruction, gentle suction can be carried out in this area. This stirs up the obstructing metered amount and may help to cause it to fall into the bag.

In another embodiment, the first granular product passage sensor is mounted in the control device. This makes it easier to assemble the sensor and control the control device.

Preferably, said second granular product passage sensor is mounted in said receiving means, which also makes assembly easier.

The invention also relates to a bagging machine comprising a flow control system according to the invention for filling a bag with a granular product. In a particularly preferred manner, the machine is an FFS machine.

Finally, the invention relates to a flow control method for filling a bag with a granular product, which method comprises the following steps:

[a] discharging a metered amount of granular material through said metering side from a metering point,

[b] detecting the passage of a metered amount, which has been previously discharged through said metering side from said metering point, through an intermediate point located between said metering and filling sides and having a passage section which can be modified,

[c] determining a first arrival time ($t_{a1}$) and a first passage time ($t_{p1}$) of said metered amount, the passage of which has been detected in step [b], said first arrival time ($t_{a1}$) being the time elapsed between the instant of discharging said metered amount from said metering side and the instant of detecting the head of said metered amount at said intermediate point, and said first passage time ($t_{p1}$) being the time elapsed between the instant of detecting said head and the instant of detecting the tail of said metered amount at said intermediate point,

[d] detecting the passage of a metered amount, which has been previously discharged through said metering side from said metering point, through a filling point located on said filling side,

[e] determining a second arrival time ($t_{a2}$) and a second passage time ($t_{p2}$) of said metered amount, the passage of which has been detected in step [d], said second arrival time ($t_{a2}$) being the time elapsed between the instant of discharging said metered amount from said metering side and the instant of detecting the head of said metered amount at said filling point, and said second passage time ($t_{p2}$) being the time elapsed between the instant of detecting said head and the instant of detecting the tail of said metered amount at said filling point, such that the following alternative step is carried out:

[i] if $t_c + t_{p2} < t_{a2}$, a subsequent metered amount (D2) of granular material is discharged, $t_c$ being a predetermined bag placement time, whereas

[ii] if $t_{p1} < t_{p2}$, said passage section of said intermediate point (22) is reduced until at least the condition of $t_{p1} \geq t_{p2}$ is complied with.

In the context of the invention, the reduction of the passage section of the intermediate point refers to the modification of the passage section so that it becomes narrower or until the granular material passage closes completely for holding the metered amount.

Going back to the invention, control of arrival and passage times as a matter of fact allows very precise monitoring of the position of a metered amount as it falls through the acceleration conduit. Accordingly, as a result of the control of the sensor in the filling area and in the intermediate point, a second metered amount can be discharged when the first metered amount still has not finished falling into the bag being filled. This allows increasing the filling speed in a very significant manner, without causing the concurrence of consecutive metered amounts.

Preferably, steps [ei] and [eii] are performed from the first passage time ($t_{p1}$), the second passage time ($t_{p2}$), and the second arrival time ($t_{a2}$), of one and the same first metered amount.

In another alternative embodiment, said steps [ei] and [eii] are performed from the second passage time ($t_{p2}$) of a first metered amount and the first passage time ($t_{p1+1}$) and the second arrival time ($t_{a2+1}$) of a second metered amount, consecutive to said first metered amount.

In another preferred embodiment having the objective of reducing the sensitivity to irregular behaviors of the granular material, said first and second passage times ($t_{p1}$, $t_{p2}$) and said first and second arrival times ($t_{a1}$, $t_{a2}$) are calculated as the arithmetic mean of the passage and arrival times of a plurality of earlier metered amounts.

In another embodiment having the objective of achieving a filling method that adapts to the instantaneous progression of bag filling, the bag placement time ($t_c$) is experimentally determined while said second metered amount falls through said acceleration conduit.

In another embodiment having the objective of mitigating the effect of errors in bag placement, said placement time $t_c$ is determined as an arithmetic mean of the placement times $t_c$ of a plurality of earlier bag placement times.

Likewise, the invention also includes other features of detail illustrated in the detailed description of an embodiment of the invention and in the accompanying figures.

BRIEF DESCRIPTION OF THE DRAWINGS

Further advantages and features of the invention will become apparent from the following description, in which, without any limiting character, preferred embodiments of the invention are disclosed, with reference to the accompanying drawings in which.

DETAILED DESCRIPTION OF AN EMBODIMENT OF THE INVENTION

Figure 1:
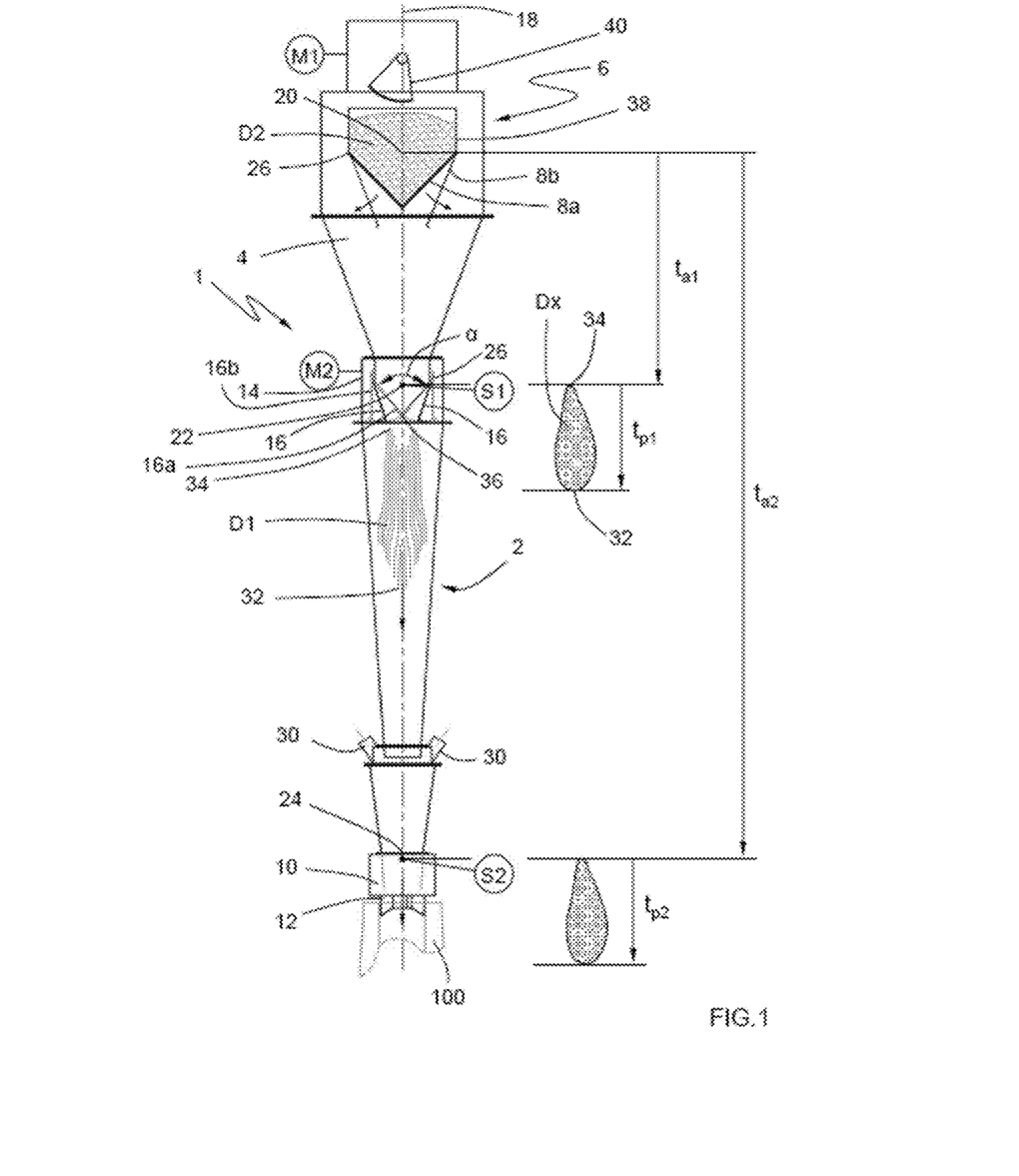
FIG. 1 shows a schematic view of the flow control system for filling bags with a granular product according to the invention.

FIG. 1 schematically shows an embodiment of the flow control system 1 for filling a bag 100 with a granular product according to the invention.

The system has a through acceleration conduit 2 arranged in a substantially vertical direction. The conduit 2 has a metering side 4 in the upper part of the drawing and a filling side 10 in the lower part. The conduit 2 has a cross-section tapering in the direction in which the granular product falls. Furthermore, the conduit 2 preferably has a cone shape in the direction from the metering side 4 to the filling side 10. Preferably, the conduit 2 is rigid and made of a sheet metal material, plastic material, or the like. Alternatively, parts of the conduit may be flexible.

Adjacent to the metering side 4 of the conduit 2 there is provided a metering device 6 consisting of a weighing device in which a metered amount of granular product is prepared to fill a bag 100 for each filling cycle. The common metered amount in systems of this type is about 25 kg. To that end, a rapid weighing system is provided in which the weighing bucket 38 is filled through the servomotor M1 which actuates the bowl 40, with a first discharge of a granular product mass close to the target mass in the weighing device until the fine adjustment of the target mass is carried out by adding the final grams required for adjusting the metered amount. This mass is therefore held in the metering device 6, ready to be discharged.

The metering device 6 comprises a metering holder 8 having two blades by way of planar plates. These two planar plates are pivotably movable about a shaft 26 between a holding position for holding a metered product amount and a discharging position for discharging the metered product amount. The movement is carried out through pneumatic cylinders not shown in detail in FIG. 1. Moreover, to facilitate understanding, in FIG. 1, the left blade in its holding position for holding the metered amount is indicated with reference number 8a, whereas reference number 8b shows the discharging position for discharging the metered amount.

The conduit 2 has on the opposite side a filling side 10. Receiving means 12 for receiving the bag 100 are provided on this side. These receiving means 12 are, for example, an inlet adapted to the cross-section of the opening of the bag 100. To assure a proper filling of the bag 100 without wastage, the bag 100 is provided for being fitted to these receiving means 12. The receiving means 12 have suction means. These allow suctioning the filling side 10 of the conduit 2 to prevent obstructions as much as possible. The suction for correcting more significant obstructions may be a continuous suction or only discrete suction. The suction means can be a conventional centrifugal pump, not shown in the drawings, connected to the outlets 30. Alternatively, the suction means can also inject a gas.

A flow control device 14 having two control blades 16 is provided between the metering side 4 and the filling side 10. As seen in FIG. 1, these control blades 16 are movable among a plurality of control positions. To enable carrying out precise control, the movement of the control blades 16 is carried out by means of the servomotor M2. Thanks to the movement of the control blades 16, the cross-section of the conduit 2 is modified. The end positions include a maximum opening position of the conduit 2 which is indicated in the drawing by means of the control blades 16 depicted with reference number 16b in FIG. 1, and a closed position of said conduit 2 which is indicated by means of the control blades 16 depicted with reference number 16a in this same drawing. In this embodiment, the two control blades 16 are in the form of planar plates that are symmetrical with respect to a longitudinal axis 18 of the conduit 2. Nevertheless, the control blades do not necessarily have to be that way, given that they may have other non-planar shapes, or in a simpler version of the system, said control blades may be a single control blade 16. Alternatively, in the concept of the blade, the control device 14 may have a plurality of blades with a diaphragm-type opening and closing system.

In the closed position of the embodiment of the drawings, the control blades 16 form an angle $\alpha$ of 90° with respect to one another. As seen in the drawings, the vertex 36 of the angle $\alpha$ points downwards, i.e., towards the filling side 10 of the conduit 2. This configuration provides a high reaction speed. In a particularly preferred manner, the angle $\alpha$ is adapted to the fluidity characteristics of the product and related to the angle of internal friction of the granular product, corresponding to the angle of the blade with respect to the direction transverse to the longitudinal axis 18.

On the other hand, the system furthermore has a first granular product passage sensor S1 provided at an intermediate point 22 located between the metering and filling sides 4, 10, upstream of the two control blades 16. In particular, it is mounted inside the control device 14 and functionally associated therewith. In that sense, the control blades 16 move actuated by the servomotor M2 depending on the signal received from the first sensor S1, as will be explained below.

The system has further a second granular product passage sensor S2 provided on the filling side 10. FIG. 1 shows that the second granular product passage sensor S2 is mounted inside the receiving means 12. Although the second sensor S2 can be mounted at many points on the filling side, it is preferably mounted adjacent to the inlet area of the bag 100, because the more the first and second sensors S1 and S2 are separated from one another, the longer the reaction time the system will have in the event that the conduit 2 is obstructed.

The metering device 6, the control device 14, and the first and second sensors S1, S2 are functionally associated with one another such that the metered amount holder 8 of the metering device 6 moves between holding and discharging positions and the blades 16 of the control device 14 move to one position from among the plurality of possible positions of the blades depending on if the first and second sensors S1, S2 detect an accumulation of granular product on the filling side 10 which may delay the filling of said bag 100. In the machines of the state of the art, a delay in filling the bag 10 along with an early discharge may cause the accumulation of two successive metered granular product amounts. In contrast, the system according to the invention solves this problem, despite significantly increasing the filling speed.

The sensors S1 and S2 that can be used include a large variety, such as optical sensors, capacitive sensors, infrared sensors, and they are responsible for providing the product passage and arrival times with respect to the different control points of the system in each cycle.

The control system 1 according to the invention is mounted in any bagging machine of the state of the art. By way of example, the system can be mounted in an FFS machine not shown in the drawings. Nevertheless, the machine does not necessarily have to be of this type, rather the system can be mounted in any type of bagging machine.

The method according to the invention is explained below. It must be mentioned that FIG. 1 shows on the right side thereof a diagram of the overlapping passage and arrival times of each step to simplify the explanation. In contrast, the rest of the drawings show the sequence as it occurs in an embodiment of the method.

Figure 2:
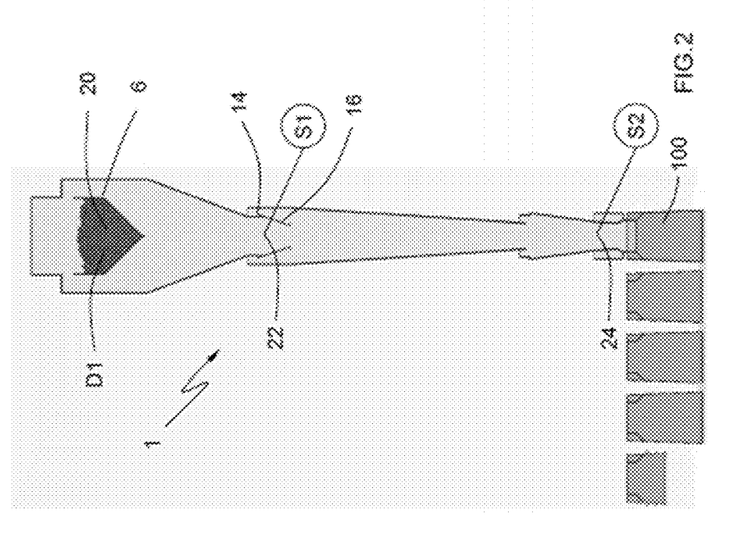
FIGS. 2 to 7 show a schematic sequence of the control method in the control system during an optimum bag filling operation.

The method according to the invention is as follows. A first metered amount D1 is discharged through the acceleration conduit 2 from a metering point 20 on the metering side 4 (see FIG. 2). This metering point 20 is located in the metering device 6 with the two pivoting blades of the metered amount holder 8. In particular, the blades of the metered amount holder 8 pivot about the corresponding shaft 26 from the closed position of FIG. 1 to an open position in a very quick movement actuated by the pneumatic cylinder, not shown in detail, which actuates said blades.

Figure 3:
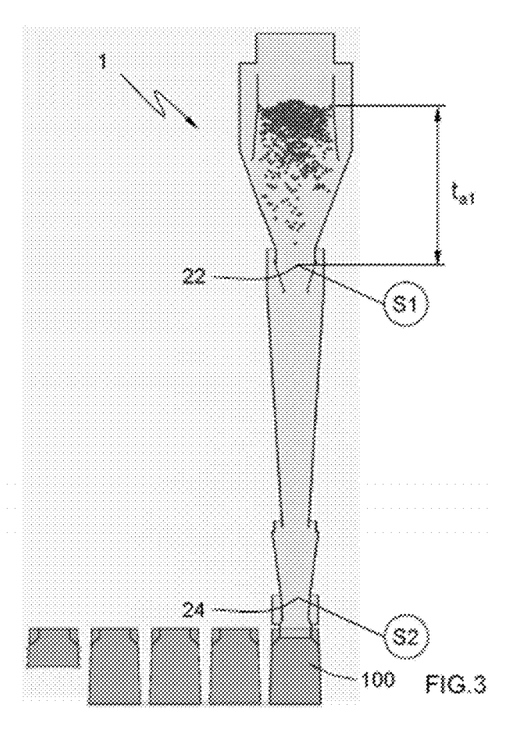

Next, as shown in FIG. 3, the passage of the first metered amount D1, which has been previously discharged through the metering side 4 from the metering point 20, is detected. Detection is carried out by the first sensor S1 at the intermediate point 22 located between the metering and filling sides 4, 10. Arranged at this point is the control device 14 which, as a result of the control blades 16, allows modifying the passage section of the conduit 2 at this point.

Figure 5:
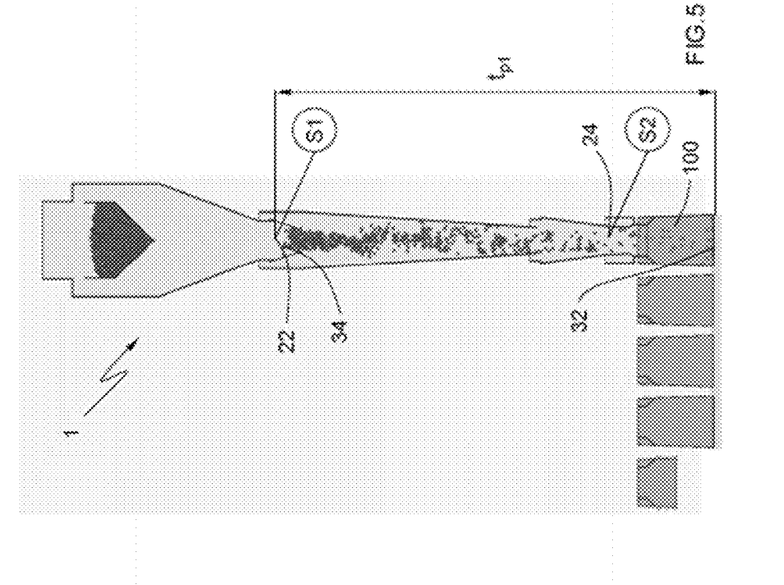

In the next step shown in FIG. 3, a first arrival time Li and then a first passage time $t_{p1}$, FIG. 5, of this first metered amount D1, the passage of which has been detected in the step of the preceding paragraph, are determined. The first arrival time Li corresponds to the time elapsed between the instant of discharging the first metered amount D1 from the metering side 4, i.e., the instant in which the blades of the metering device 6 open, and the instant of detecting the head 32 of the metered amount D1 at the intermediate point 22. In turn, the first passage time $t_{p1}$ is the time elapsed between the instant the first sensor S1 detects said head 32 and the instant the same sensor S1 also detects the tail 34 of the first metered amount D1 at the intermediate point 22. To better understand the determination of the first passage time $t_{p1}$, reference is made to FIG. 1 in which a compact metered amount Dx has been indicated.

Next, the passage of the first metered amount D1, which has been previously discharged through said metering side 4 from the metering point 20, through a filling point 24 located on said filling side 10, is detected by means of the second sensor S2.

Figure 4:
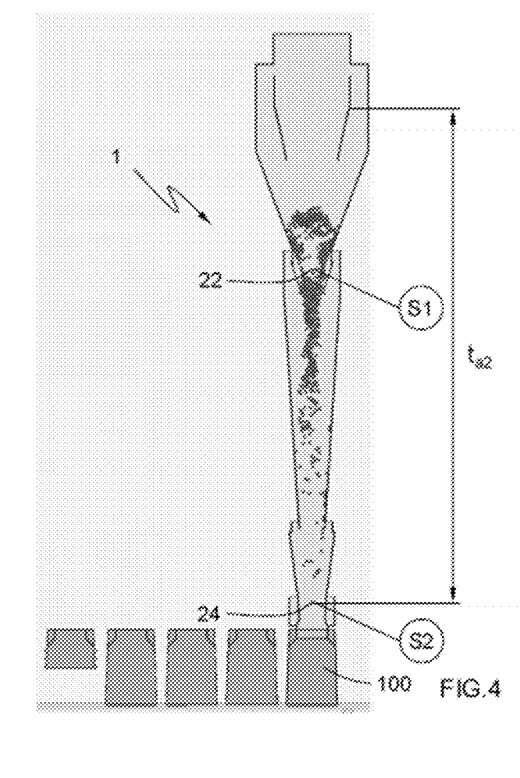
Figure 6:
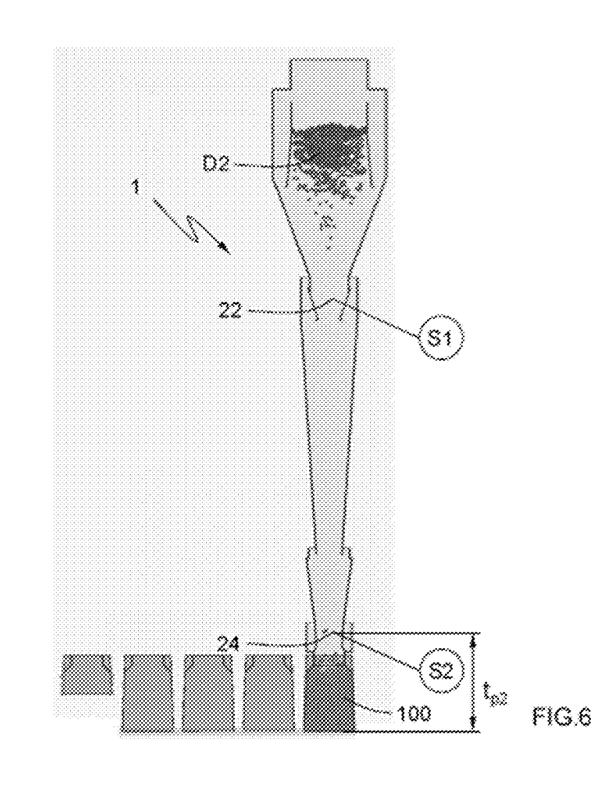

Thanks to the the detection step, a second arrival time $t_{a2}$, FIG. 4, and a second passage time $t_{p2}$, FIG. 6, of the first metered amount D1, the passage of which has been detected in the step of the preceding paragraph, can be determined.

The second arrival time $t_{a2}$ is the time elapsed between the instant of discharging the first metered amount D1 from the metering side 4 and the instant of detecting the head 32 of the metered amount D1 at the filling point 24. In turn, the second passage time $t_{p2}$ is the time elapsed between the instant of detecting said head 32 and the instant of detecting the tail 34 of the first metered amount D1 at the filling point 24.

Figure 7:
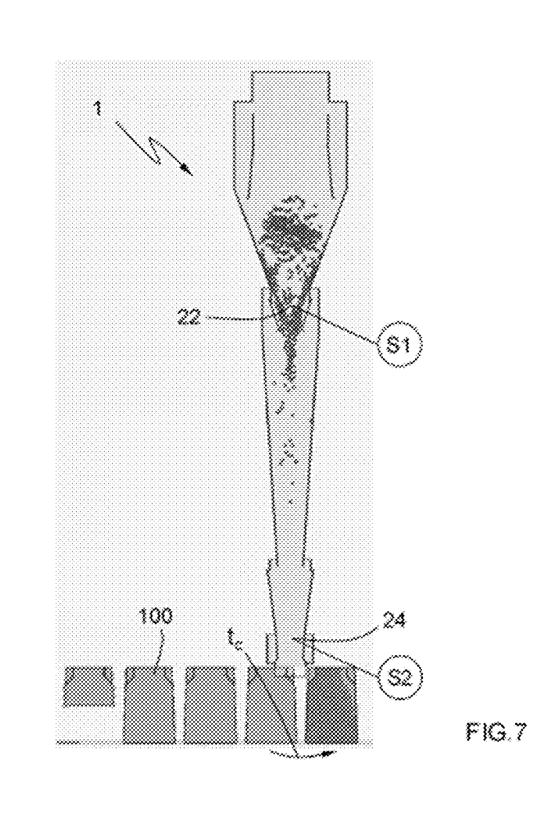

Finally, the following alternative step is carried out: if $t_c+t_{p2}<t_{a2}$, a second metered amount D2 of granular material is discharged, $t_c$ being a predetermined bag placement time. This situation is depicted in FIGS. 6 and 7. In this situation, the second metered amount D2 is falling through the conduit 2 but there is, nevertheless, enough time to finish filling the preceding bag with the first metered amount D1, remove the bag being filled, and put the bag to be filled with the second metered amount D2 in place, before the second metered amount leaves the conduit 2 for the bag.

In contrast, if $t_{p1}<t_{p2}$ the blades 16 are closed and the passage section of the intermediate point 22 is reduced until at least the condition of $t_{p1} \geq t_{p2}$ is complied with. The objective of this control condition is to delay or, if necessary, hold the subsequent metered amount to facilitate the falling of the first metered amount D1 into the corresponding bag.

The steps described in the immediately preceding paragraph are performed from the first passage time $t_{p1}$, the second passage time $t_{p2}$, and the second arrival time $t_{a2}$, of one and the same first metered amount D1. Nevertheless, in an alternative embodiment with respect to the one described, the steps of comparing times to decide on the partial or complete closure of the blades 16 of the control device 14 are performed from the second passage time $t_{p2}$ of a first metered amount D1 and the first passage time $t_{p1+1}$, and the second arrival time $t_{a2+1}$ of a second metered amount D2, consecutive to said first metered amount D1.

Based on the foregoing, one of the following alternative steps is carried out: if $t_{c+1}+t_{p2}<t_{a2+1}$, a second metered amount D2 of granular material is discharged, $t_{c+1}$ being the placement time of the bag which receives the second metered amount. In contrast, if $t_{p1+1}<t_{p2}$ the blades 16 are closed and the passage section of the intermediate point 22 is reduced until at least the condition of $t_{p1+1} \geq t_{p2}$ is complied with.

In another embodiment, in order to obtain a more robust control that is less sensitive to product flow irregularities, said first and second passage times $t_{p1}$, $t_{p2}$ and said first and second arrival times $t_{a1}$, $t_{a2}$ are calculated as the arithmetic mean of the passage and arrival times of a plurality of earlier metered amounts.

Finally, the bag placement time $t_c$ can be a predetermined constant, but it is preferably determined experimentally while the second metered amount D2 falls through said acceleration conduit 2. Moreover, and like the arrival and passage times, the placement time $t_c$ can also be determined as an arithmetic mean of the placement times $t_c$ of a plurality of earlier bag placement times.

Figure 8:
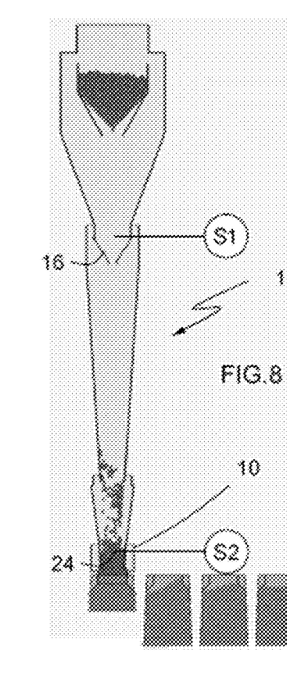
FIGS. 8 to 10 show a schematic sequence of the method when unwanted obstruction of the acceleration conduit occurs.
Figure 9:
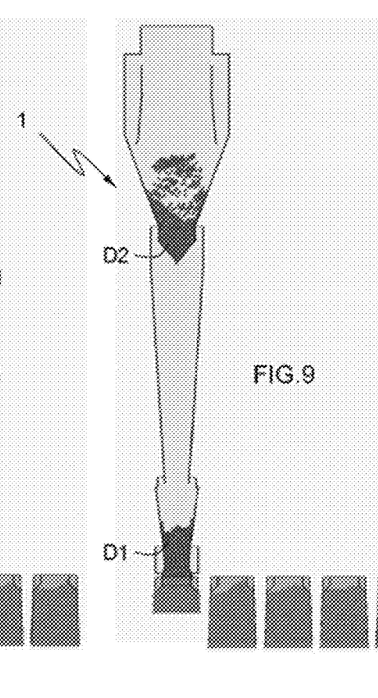
Figure 10:
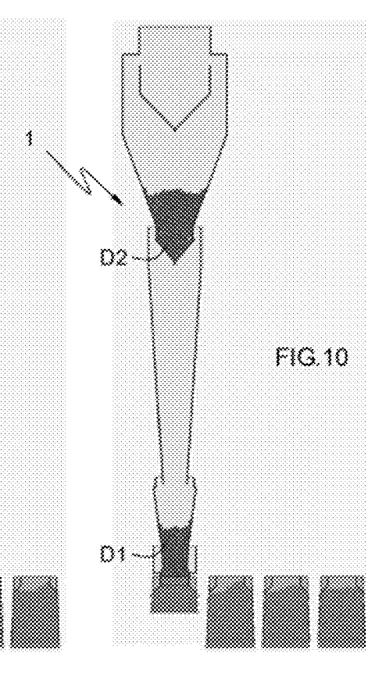

The sensors S1 and S2 mounted in a closed loop provide, in each cycle, the product passage times and at the end of the acceleration conduit 2. With this information, the servomotor M2 drive will gradually adjust, if necessary, the opening for product passage to the conduit 2. By way of example, a time of passage through the first sensor S1 arranged at the inlet of the acceleration conduit 2 that is significantly less than the time of passage through the second sensor S2 located on the filling side will indicate that the product travelling through the acceleration conduit is slowing down. As a result, there is an excess supply at the inlet of the acceleration conduit 2, and accordingly reduced production. This situation is shown in FIGS. 8 to 10. These drawings show how the first metered amount D1 gradually accumulates upstream of the conduit 2. This situation is detected by the second sensor S2 given that the condition $t_{p1}<t_{p2}$ is complied with. As a result of this situation, the blades 16 are closed and although the second metered amount D2 is already falling through the conduit 2, it is held in the control device 14 (see FIGS. 9 and 10), waiting for the obstruction on the filling side 10 to be corrected.

Therefore and based on the information obtained by the first and second sensors S1 and S2, the system will make the necessary adjustments in an attempt to equalize both times, always seeking the suitable adjustment for optimum production.

The invention claimed is:

1. A flow control method for filling a bag with a granular product through an acceleration conduit, said acceleration conduit having a metering side and a filling side for filling said bag where an initial bag is located, wherein the flow control method comprises the following steps:

[a] discharging a metered amount of granular material through said metering side from a metering point,

[b] detecting, using a first sensor, the passage of said metered amount, which has been previously discharged through said metering side from said metering point, through an intermediate point located between said metering and filling sides and having a modifiable passage section,

[c] determining a first arrival time and a first passage time ($t_{p1}$) of said metered amount, the passage of which has been detected in step [b], said first arrival time being the time elapsed between the instant of discharging said metered amount from said metering side and the instant of detecting a head of said metered amount at said intermediate point, and said first passage time being the time elapsed between the instant of detecting said head and the instant of detecting a tail of said metered amount at said intermediate point,

[d] detecting, using a second sensor, the passage of said metered amount, which has been previously discharged through said metering side from said metering point, through a filling point located on said filling side,

[e] determining a second arrival time ($t_{a2}$) and a second passage time ($t_{p2}$) of said metered amount, the passage of which has been detected in step [d], said second arrival time being the time elapsed between the instant of discharging said metered amount from said metering side and the instant of detecting the head of said metered amount at said filling point, and said second passage time being the time elapsed between the instant of detecting said head and the instant of detecting the tail of said metered amount at said filling point, and

[ei] in response to determining that a predetermined bag placement time ($t_c$)+$t_{p2}$<$t_{a2}$, discharging a subsequent metered amount of granular material, or

[eii] in response to determining that $t_{p1}<t_{p2}$, reducing said passage section of said intermediate point until at least the condition of $t_{p1}≥t_{p2}$ is complied with.

2. The method according to claim 1, wherein performance of said steps [ei] and [eii] is from the first passage time, the second passage time, and the second arrival time, of one and the same first metered amount.

3. The method according to claim 1, wherein performance of said steps [ei] and [eii] is from the second passage time of a first metered amount and the first passage time and the second arrival time of a second metered amount, consecutive to said first metered amount.

4. The method according to claim 1, further comprising calculating said first and second passage times and said first and second arrival times as the arithmetic mean of the passage and arrival times of a plurality of earlier metered amounts.

5. The method according to claim 1, further comprising experimentally determining the bag placement time while said second metered amount falls through said acceleration conduit.

6. The method according to claim 5, further comprising determining said placement time $t_c$ as an arithmetic mean of the placement times $t_c$ of a plurality of earlier bag placement times.

* * * * *